(12) United States Patent
Miller

(10) Patent No.: US 10,439,413 B1
(45) Date of Patent: Oct. 8, 2019

(54) ISOLATION JUMPER CABLES

(71) Applicant: Vern E Miller, Lewisville, LA (US)

(72) Inventor: Vern E Miller, Lewisville, LA (US)

( * ) Notice: Subject to any disclaimer, the term of this patent is extended or adjusted under 35 U.S.C. 154(b) by 0 days.

(21) Appl. No.: 16/040,889

(22) Filed: Jul. 20, 2018

Related U.S. Application Data

(63) Continuation-in-part of application No. 15/612,281, filed on Jun. 2, 2017, now abandoned.

(60) Provisional application No. 62/354,228, filed on Jun. 24, 2016.

(51) Int. Cl.
| | |
|---|---|
| *H01R 13/717* | (2006.01) |
| *H02J 7/00* | (2006.01) |
| *H01R 13/28* | (2006.01) |
| *H02J 1/00* | (2006.01) |

(52) U.S. Cl.
CPC ............ *H02J 7/0054* (2013.01); *H01R 13/28* (2013.01); *H01R 13/7175* (2013.01); *H02J 7/0029* (2013.01); *H02J 2001/006* (2013.01); *H02J 2007/0037* (2013.01)

(58) Field of Classification Search
CPC .......................... H02J 2001/006; H02J 7/0034
See application file for complete search history.

(56) References Cited

U.S. PATENT DOCUMENTS

| | | | | | |
|---|---|---|---|---|---|
| 4,420,212 | A | * | 12/1983 | Wright ................. | H02J 7/0034 439/490 |
| 4,757,250 | A | * | 7/1988 | Guim ................... | H02J 7/0034 320/105 |
| 4,825,150 | A | * | 4/1989 | Sirasud ................ | G01R 19/155 324/133 |
| 5,668,461 | A | * | 9/1997 | Hancock .............. | H02J 7/0034 320/103 |
| 5,796,255 | A | * | 8/1998 | McGowan ........... | H02J 7/0034 324/429 |
| 2005/0031944 | A1 | * | 2/2005 | Sodemann ........... | F02N 11/12 429/150 |
| 2010/0173182 | A1 | * | 7/2010 | Baxter ................. | H01M 10/42 429/61 |
| 2016/0329731 | A1 | * | 11/2016 | Kokot, Jr. ............ | H02J 7/0054 |

* cited by examiner

*Primary Examiner* — David V Henze-Gongola
(74) *Attorney, Agent, or Firm* — Kenneth L Tolar

(57) ABSTRACT

Jumper cables include a housing with first and second pairs of cables extending therefrom. On an upper surface of the housing are a pair of dual-color LEDs, each associated with one of the pairs of cables. Circuitry within the housing causes each LED to illuminate in one of two discrete colors when the polarity of the cables is reversed. A rotary isolation dial with multiple visual indicators allow a user to independently verify that the polarity of each pair of cables is correct before establishing electrical communication between two batteries. The LED circuits include a surge suppressor that protects the rescuing vehicle and the disabled vehicle's electrical system from alternator load dump when the rescuing vehicle's engine is running. Adapters allow an auxiliary power source to be coupled with the jumper cables in the event the dead battery is incapable of powering the LEDs and alarms.

9 Claims, 11 Drawing Sheets

ISOLATION JUMPER CABLES

CROSS REFERENCE TO RELATED APPLICATIONS

This application is a continuation-in-part of application Ser. No. 15/612,281 filed on Jun. 2, 2017, which claimed the benefit of provisional patent application No. 62/354,228 filed on Jun. 24, 2016, the specifications of which are both incorporated herein by reference.

BACKGROUND OF THE INVENTION

The present invention relates to jumper cables having both a visual and audible indicator that allow a user to independently verify a proper connection to each of two batteries before establishing current flow therebetween.

DESCRIPTION OF THE PRIOR ART

Jumper cables are routinely used to allow a charged battery in one vehicle to start the engine of another vehicle having a dead battery. However, the cables must be connected to the proper terminal on each battery, i.e., the red clamps to the positive terminals and the black clamps to ground or the negative terminals. Reversing the polarity between the two batteries generates sparks that can cause a fire or an explosion, and can damage one or both vehicles' electrical systems.

Accordingly, there is currently a need for a device that prevents jumper cables from being improperly connected to a vehicle battery. A review of the prior art reveals a myriad of jumper cables that are designed to prevent the above-described problems. For example, U.S. Pat. No. 4,272,142 to Zapf discloses jumper cables that are joined with a pair of detachable connectors. Each connector includes a pair of LEDs for visually indicating when the cables are properly fastened to a battery.

U.S. Pat. No. 4,420,212 issued to Wright discloses jumper cables including a housing with a pair of electrically connected cables extending from each of two sides thereof. The housing includes two sets of discretely colored LEDs for visually indicating when each pair of cables are properly connected to a battery.

U.S. Pat. No. 4,701,688 issued to Guim discloses a pair of jumper cables extending from each side of a protective box having polarity-verifying LEDs thereon. The box also includes delay circuitry for establishing electrical connection between the two cables after a predetermined duration to prevent sparks.

U.S. Pat. No. 5,297,977 issued to Lamper discloses a pair of jumper cables interconnected with a junction plate having a switch for selectively establishing electrical communication therebetween. The device allows a user to connect both cables to a dead and charged battery before electrical communication is established to prevent sparking.

U.S. Pat. No. 5,796,255 issued to McGowan discloses a pair of jumper cables extending from a housing having indicator LEDs thereon for verifying a correct connection to each of two batteries. A solenoid allows current to flow between the two batteries if the cables are correctly connected to each.

U.S. Pat. No. 6,921,286 issued to Fernandez discloses jumper cables having at least one LED and a fiber-optic bundle thereon that are illuminated when properly connected to a battery.

As indicated above, various jumper cables with warning LEDs exist in the prior art. Although Lamper discloses a switch between two jumper cables that allows a user to prevent electrical communication until the cables are connected, it does not disclose multiple visual indicators that allow the user to repeatedly and sequentially verify appropriate polarity. The device requires the user to verify the polarity in a conventional fashion, i.e., observing the cable colors, which often results in incorrect connections.

Though the patent to McGowan discloses cables with light verification and an automated means for interconnecting the two cables, the device relies upon the operability and reliability of an internal solenoid to assure that two improperly cables are not energized. Thus, if the internal electronics fail, then two batteries may be interconnected resulting in sparking, a fire or an explosion.

Finally, the patent to Zapf discloses detachable connectors with designated LEDs that allow each pair of cables to be individually connected and the polarity verified before interconnecting the two batteries. However, the electrical connection between the cables must be established with a mechanical coupling that is laborious and inconvenient to manipulate. Furthermore, when the two cables are detached, one can be easily misplaced.

The present invention overcomes the disadvantages of the above-described prior art by providing jumper cables having a rotary isolation dial between the two cables that, when rotated to a select position, establishes electrical communication therebetween. The dial is configured to conspicuously convey to a user in several respects when the two cables are electrically connected to allow the user to repeatedly and sequentially verify appropriate polarity. Furthermore, the device includes accompanying attachments for coupling an auxiliary power source in the event the dead battery is too depleted to operate the LED and alarm circuits. Moreover, unlike conventional jumper cables, the present invention includes surge suppressors that protect both vehicles' electrical system from alternator load dump when the rescuing vehicle's engine is running.

SUMMARY OF THE INVENTION

The present invention relates to jumper cables comprising a housing having a first pair of cables extending from an upper side and a second pair of cables extending from a lower side. Each of the first pair of cables includes either a red clamp at a distal end for coupling with a positive battery terminal or a black clamp for coupling with the negative terminal. Similarly, each of the second pair of cables terminates at either a black or red battery terminal clamp.

On the upper surface of the housing, near each pair of cables, is a dual-color LED designed to illuminate in either of two discrete colors, i.e., green or red, depending upon current direction. Between the two LEDs is a rotary isolation dial that establishes electrical between the first and second pairs of cables. When the clamps are properly connected to the corresponding battery terminals, current flows in a first direction to cause the LED to illuminate green. Conversely, when the clamps on either pair of cables are incorrectly coupled with a battery, current flows in an opposite direction thereby illuminating the LED red, and activating an audible alarm so that a user can verify polarity before establishing electrical communication between the two batteries. The rotary dial is specifically configured to overtly notify a user that the two cables are not electrically interconnected to allow the user to safely verify polarity at each battery. The LED circuits include a surge suppressor that protects both the disabled vehicle and the rescuing vehicle's electrical system from alternator load dump when the rescuing vehicle's engine is running. Adapters allow an auxiliary power source to be coupled to the jumper cables in the event the dead battery is incapable of powering the LEDs and alarms.

It is therefore an object of the present invention to provide jumper cables having multiple visual indicators for verifying a proper connection to each of two batteries before allowing current flow therebetween.

It is therefore another object of the present invention to provide jumper cables having an audible and/or vibratory indicator for verifying a proper connection to each of two batteries before allowing current flow therebetween.

It is yet another object of the present invention to provide jumper cables that prevent sparks, explosions and electrical system damage when interconnecting a pair of batteries.

It is yet even another object of the present invention to provide jumper cables having a means for powering LED verifiers in the event the dead battery is completely exhausted.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
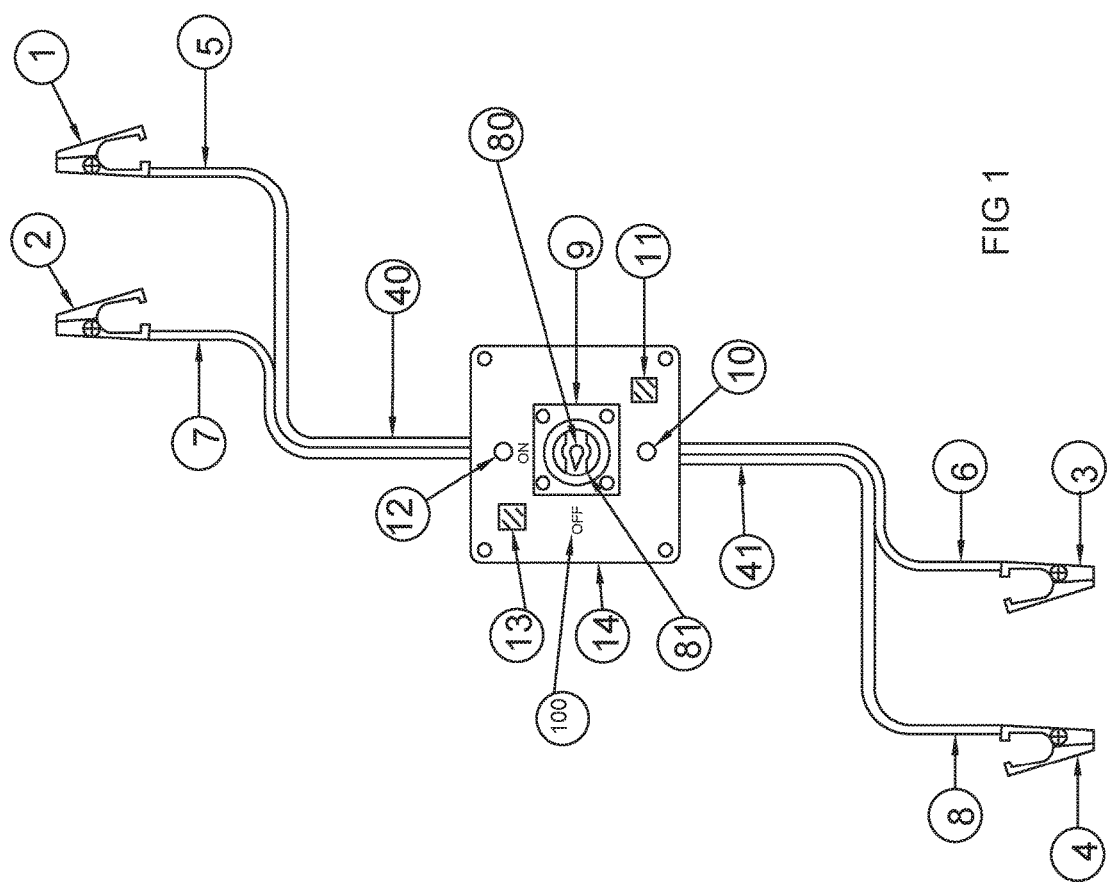
FIG. 1 is a top, plan view of the jumper cables according to the present invention.
Figure 2:
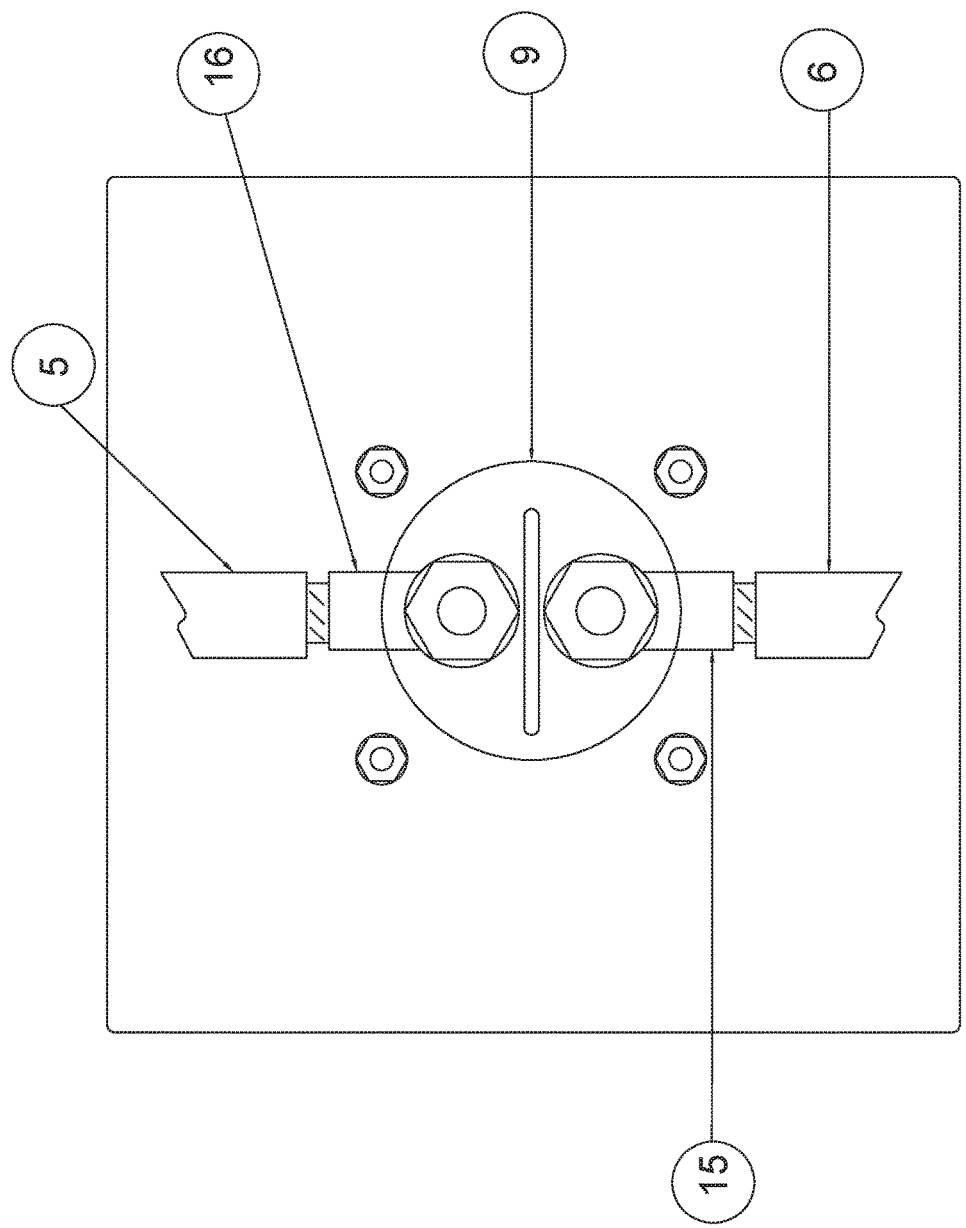
FIG. 2 is a sectional view of the housing depicting the red cables attached to the rotary isolation dial.
Figure 3:
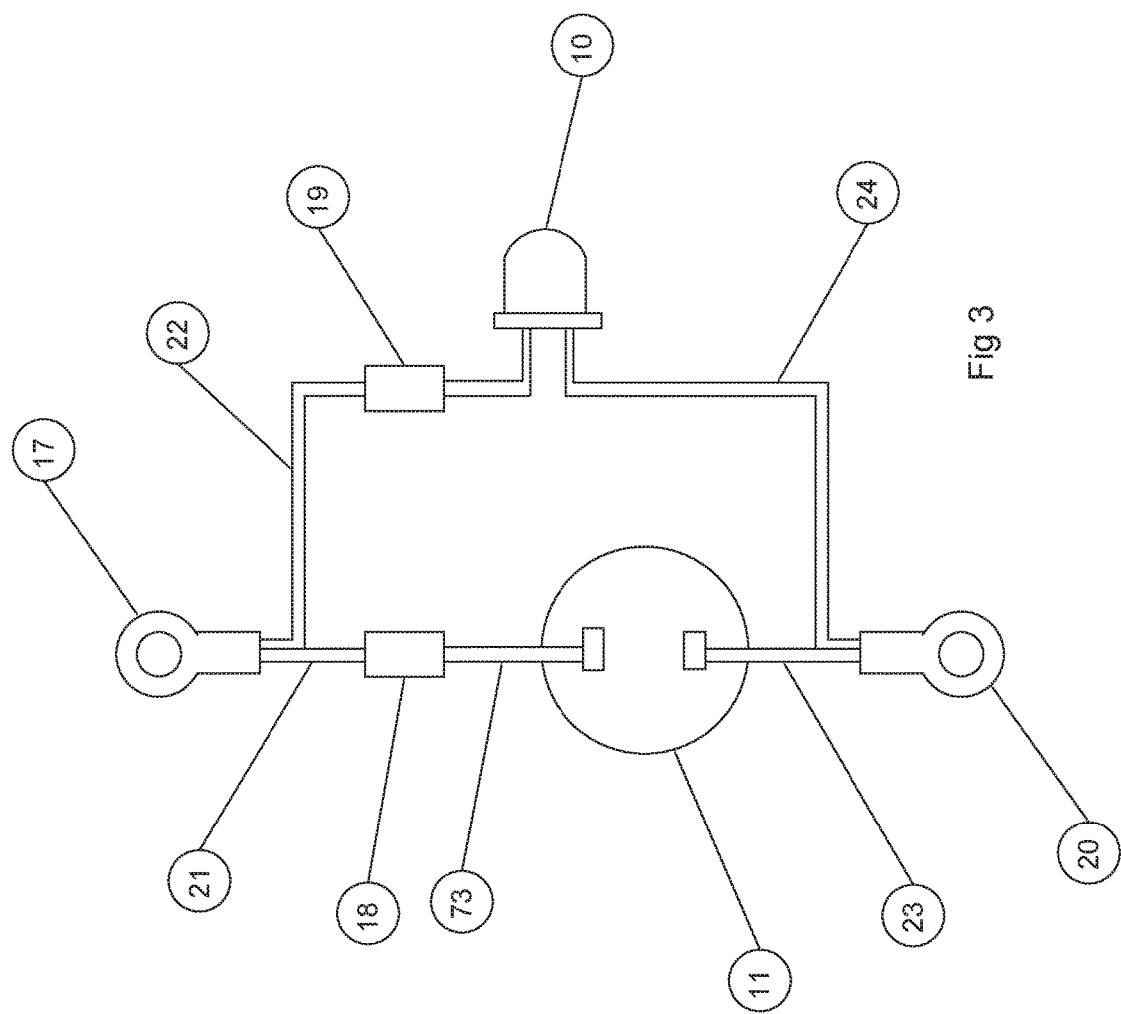
FIG. 3 depicts a diagram of the lower internal LED circuit.
Figure 4:
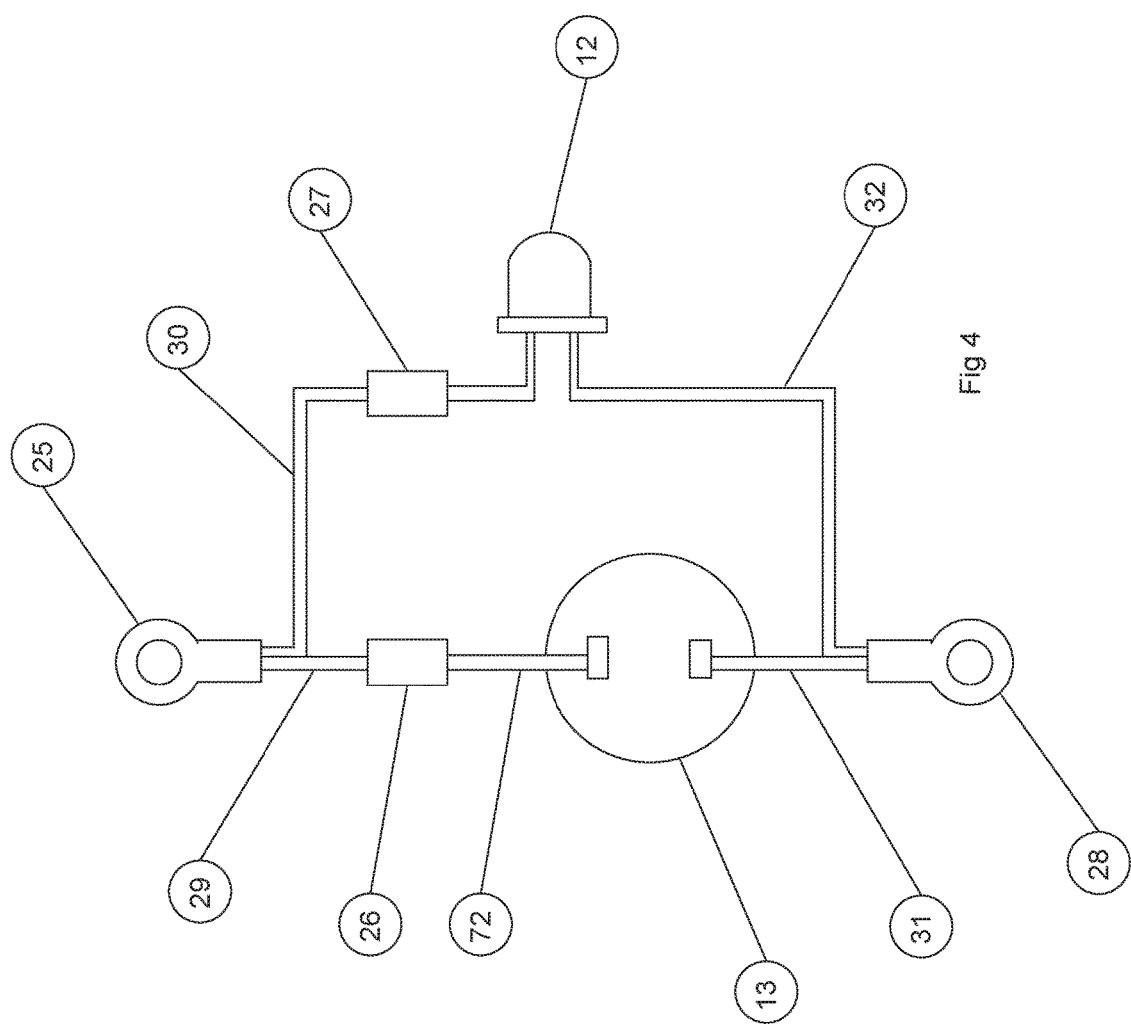
FIG. 4 depicts a diagram of the upper internal LED circuit.
Figure 5:
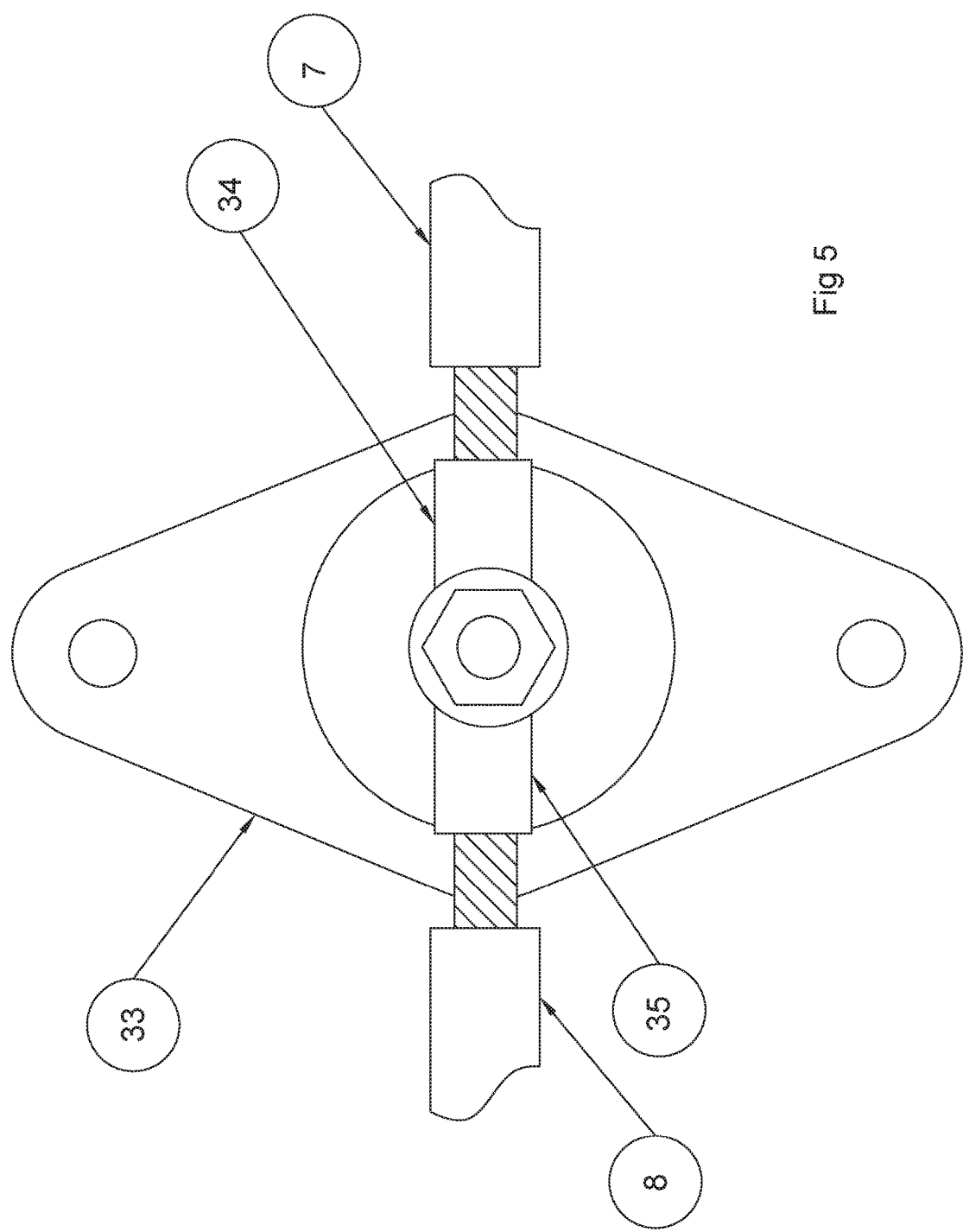
FIG. 5 depicts the connection of the two black cables to the rotary isolation dial.
Figure 6:
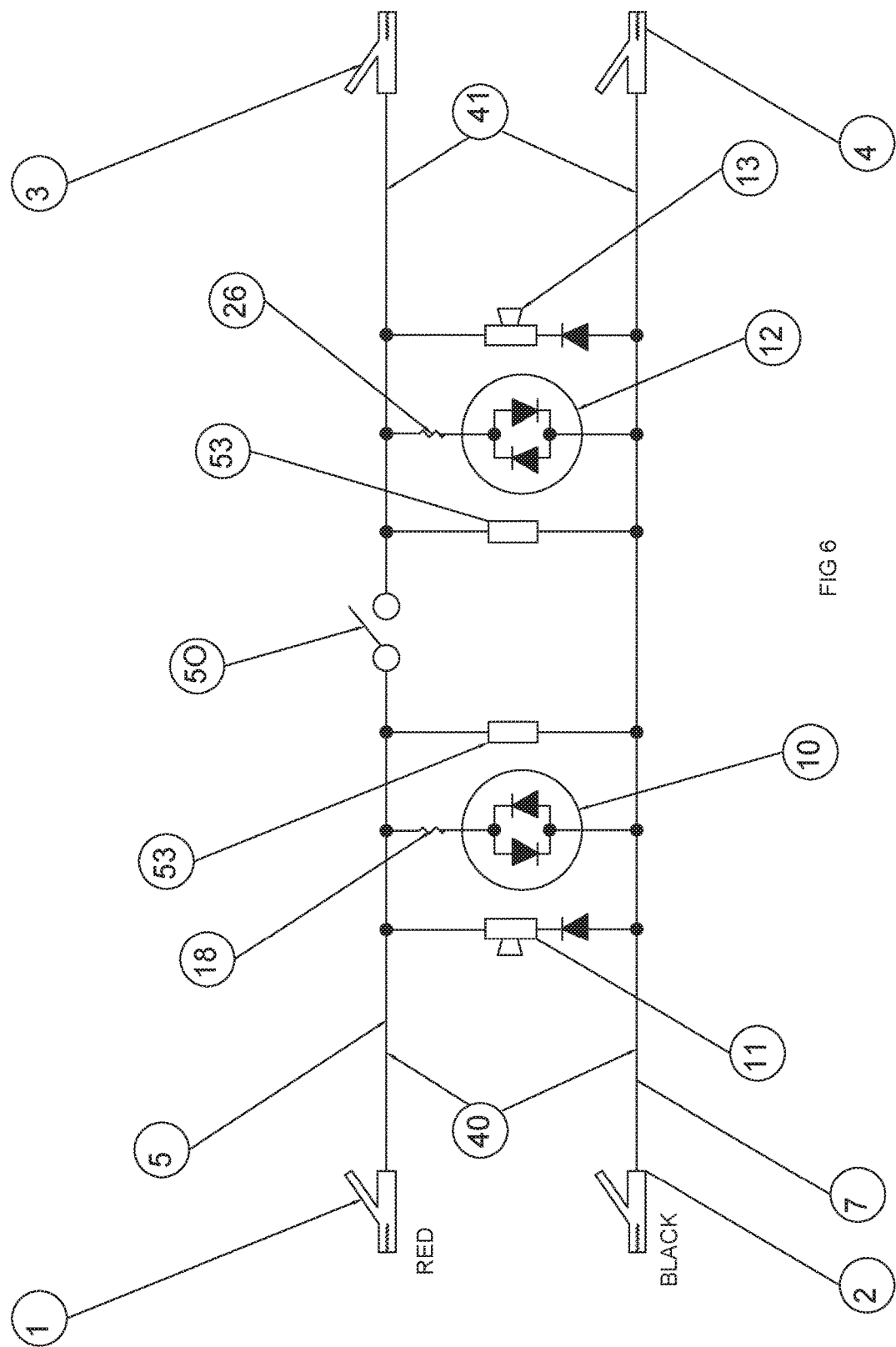
FIG. 6 depicts a second embodiment of the upper and lower LED circuits using a single-pole switch.
Figure 7:
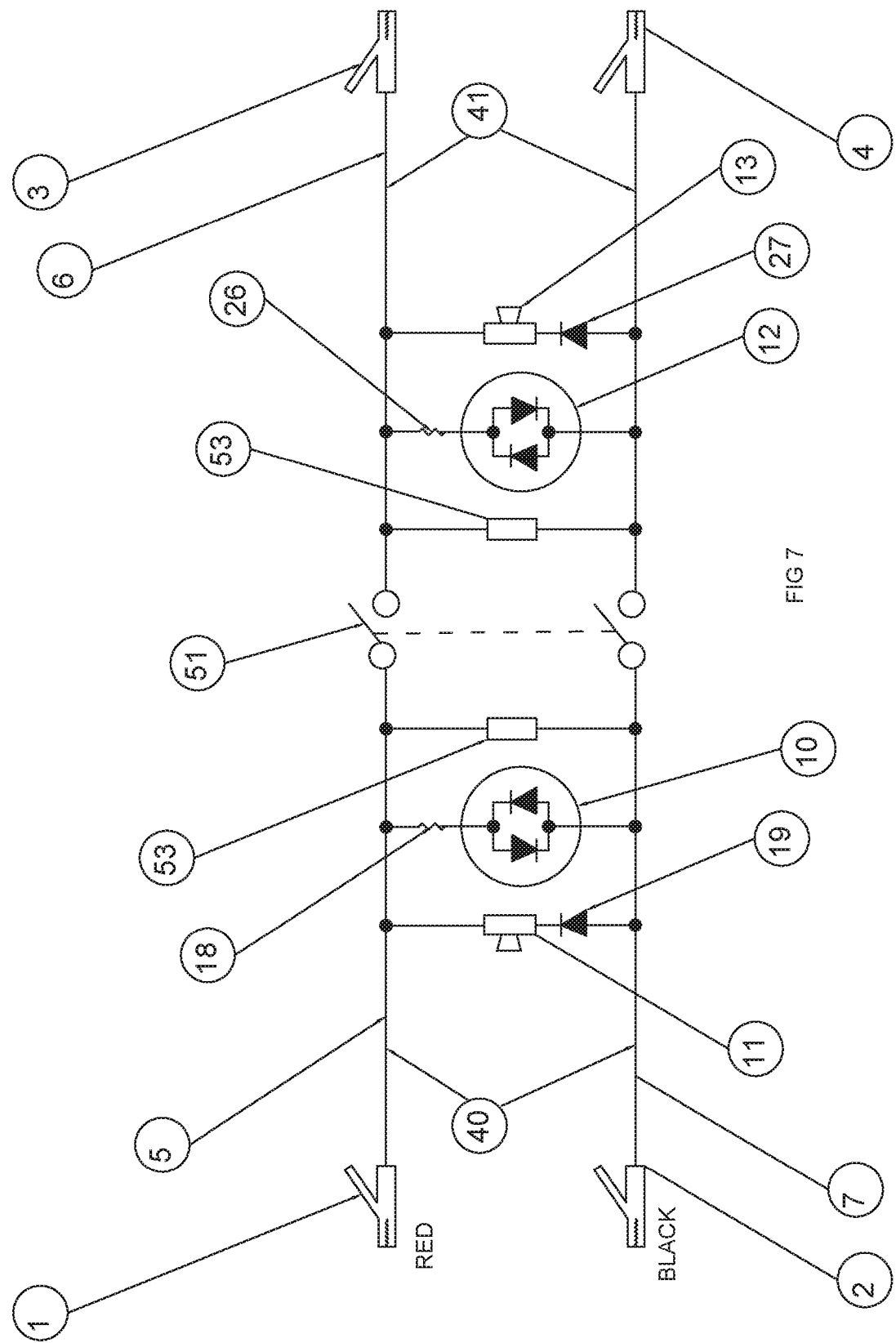
FIG. 7 depicts the circuits of FIG. 6 employing a double-pole switch.
Figure 8:
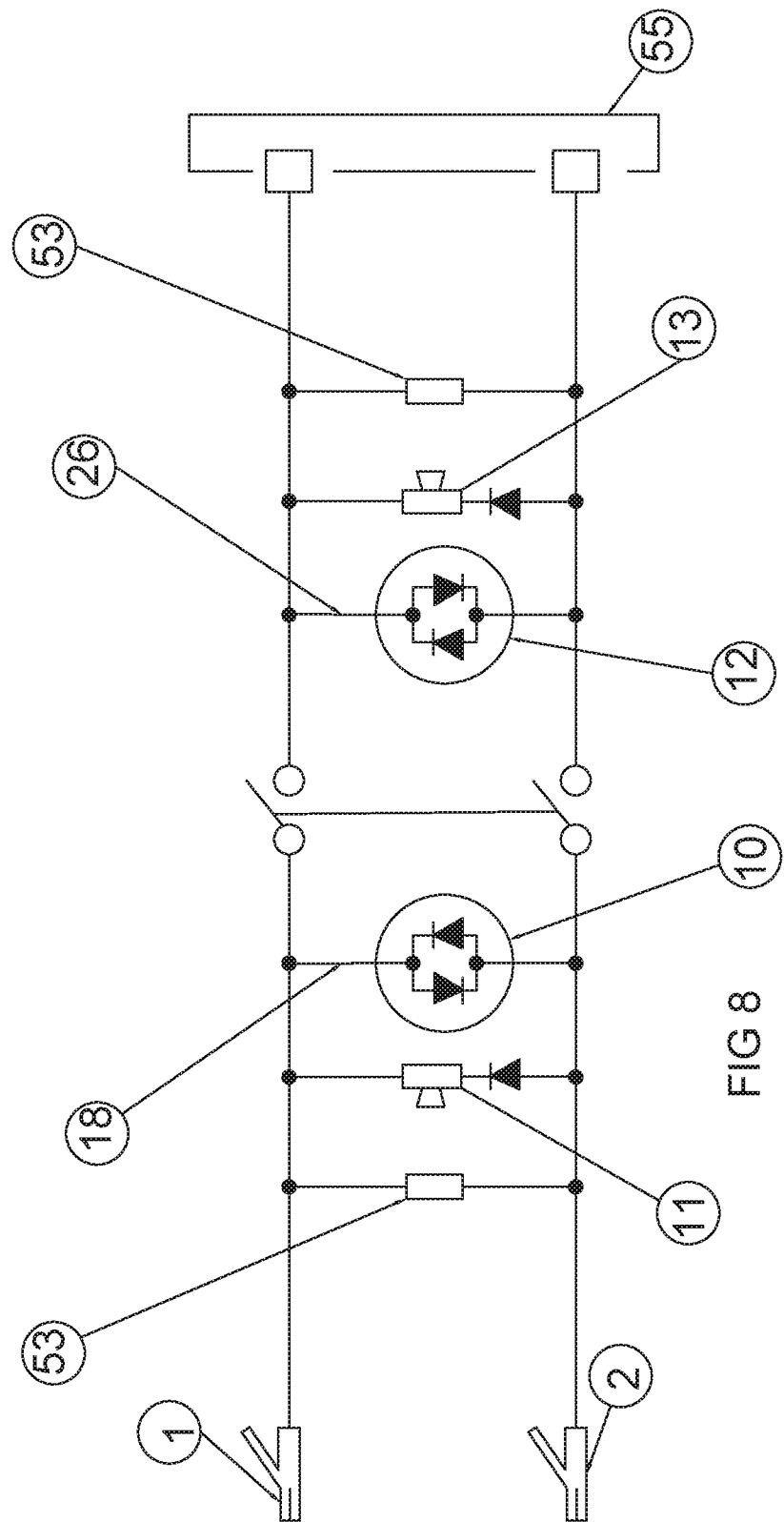
FIG. 8 depicts the circuit of FIG. 7 with an additional connector for coupling with a service vehicle's plug-in jumper cables.

The present invention relates to jumper cables comprising a housing having an upper side, a lower side, a front surface and an interior. A first pair 40 of cables extend from the upper side and a second pair 41 of cables extend from the lower side. One 5 of the first pair of cables is red and includes a red clamp 1 at a distal end for coupling with a positive battery terminal. The other cable 7 is black and includes a black clamp 2 at a distal end for coupling with the negative terminal. Similarly, one 6 of the second pair of cables is red and terminates at a red clamp 3 for coupling with the positive battery terminal of a dead battery. The other cable 8 terminates at a black clamp 4 for coupling with the negative terminal of the dead battery.

On the upper surface of the housing, near the first pair of cables, is a dual-color LED 12 designed to illuminate in either of two discrete colors, i.e., green or red, depending upon current direction. A similar dual-color LED 10 is positioned adjacent the second pair of cables.

The upper LED circuit includes an alarm branch 72 with a resistor 26, an alarm 13, i.e., a piezo buzzer, a vibratory motor or similar equivalent, an upper terminal 25 and a lower terminal 28. In parallel to the alarm branch is a diode 27 and the LED 12, which are also electrically connected to the upper terminal 25 and lower terminal 28. The lower LED circuit includes an alarm branch 73 with a resistor 18, an alarm 11, i.e., a piezo buzzer, a vibratory motor or similar equivalent, an upper terminal 17 and a lower terminal 20. In parallel to the alarm branch 72 is a diode 19 and the LED 10, which are also connected to the upper terminal 17 and lower terminal 20.

Mounted on the upper surface of the housing, between the two LEDs 12, 10 is a rotary isolation dial 9 that establishes electrical communication between the first pair of cables and the second pair of cables when rotated to a select position. The dial includes a tapered handle 80 with an arrow 81 positioned thereon that points to indicia 100 on the housing, i.e., "OFF," when electrical communication between the first and second cables is disabled. Furthermore, the elongated handle is perpendicular to the cables and the resulting direction of current flow to provide an additional visual indicator that electrical communication has been disabled. When the dial is rotated ninety degrees to the select position, the arrow points to indicia, i.e., "ON," to indicate that electrical communication between the first and second cables has been established. Furthermore, the handle is parallel to the cables and the resulting direction of current flow to further indicate that electrical communication has been established. Adjacent to the dial are a pair of speakers 77, 78 for emitting the output from one of the alarms.

Now referring to FIGS. 6-9, a slightly different version of the LED and alarm circuits may include either of a single-pole 50 or double-pole 51 switch that is operated with the rotary dial 9. The single-pole switch 50 in most cases will sufficiently operate the device as described herein; however, in rare cases of extreme user error in connecting the cables, the double-pole switch 51 will totally isolate the two circuits to prevent complete short-circuiting of a battery. The circuit may also include a connector 55 that is configured to couple with plug-in jumper cable systems often used in service vehicles, tow trucks, boat trailers and other vehicles that regularly jump-start dead batteries.

The circuits of FIGS. 6-9 further include a means for protecting the electrical system of both the disabled vehicle and the rescuing vehicle while the disabled vehicle is being started with jumper cables. When two batteries are interconnected with conventional jumper cables, the output of the alternator in the rescuing vehicle will significantly increase to compensate for the load draw of the dead battery. If the ignition switch in the disabled vehicle is briefly disengaged, as is often the case between start attempts, there is a minuscule delay until the alternator's regulator is able to reduce the increased output. Therefore, the alternator may briefly continue to generate the higher voltage, which can damage or ruin computer modules and other expensive components of both vehicles' electrical system. This phenomenon is often referred to as "load draw" and causes significant damage each year to vehicles jump-started with conventional jumper cables. To protect both vehicles' electrical systems from any potential load draw, the circuit further includes a surge suppressor 53, such as a metal oxide varistor, a transient-voltage suppression diode, a gas discharge tube or any other similar device.

Figure 9:
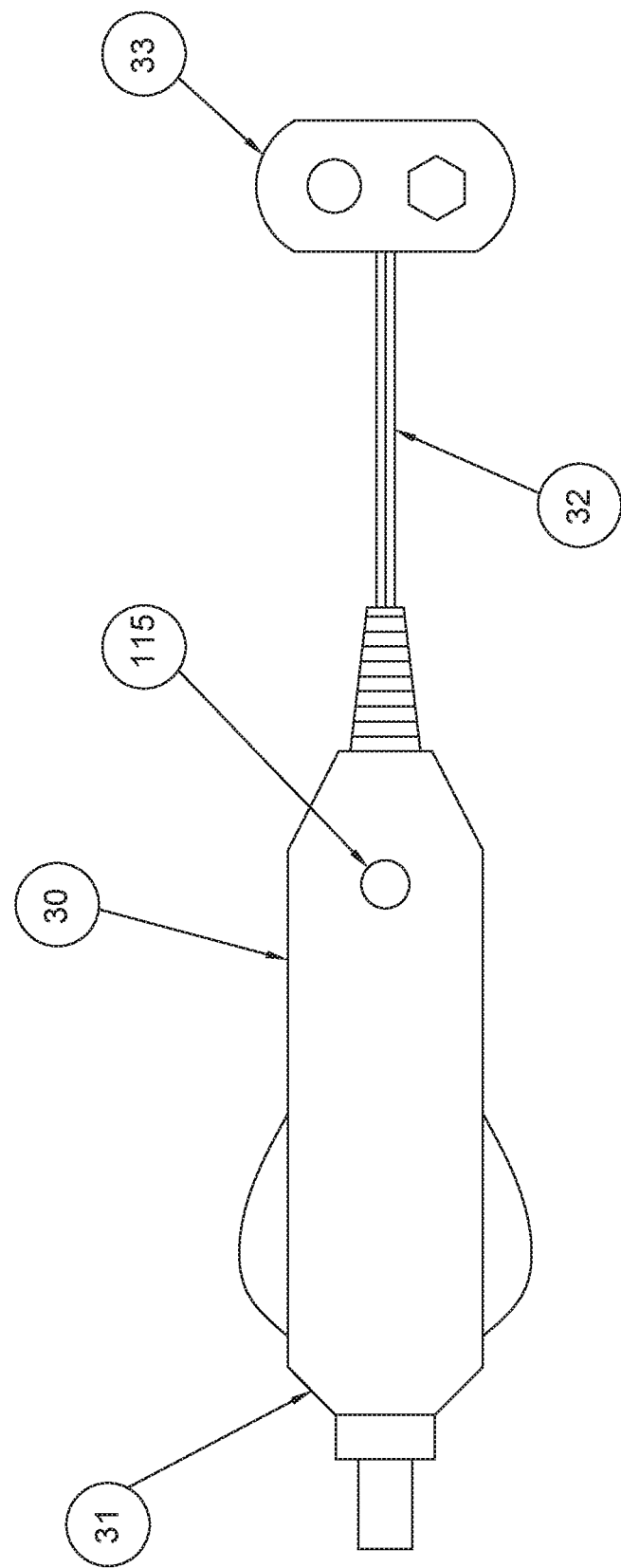
FIG. 9 depicts an auxiliary power source adapter for operating the LED and alarm circuits when the dead battery is completely exhausted.
Figure 10:
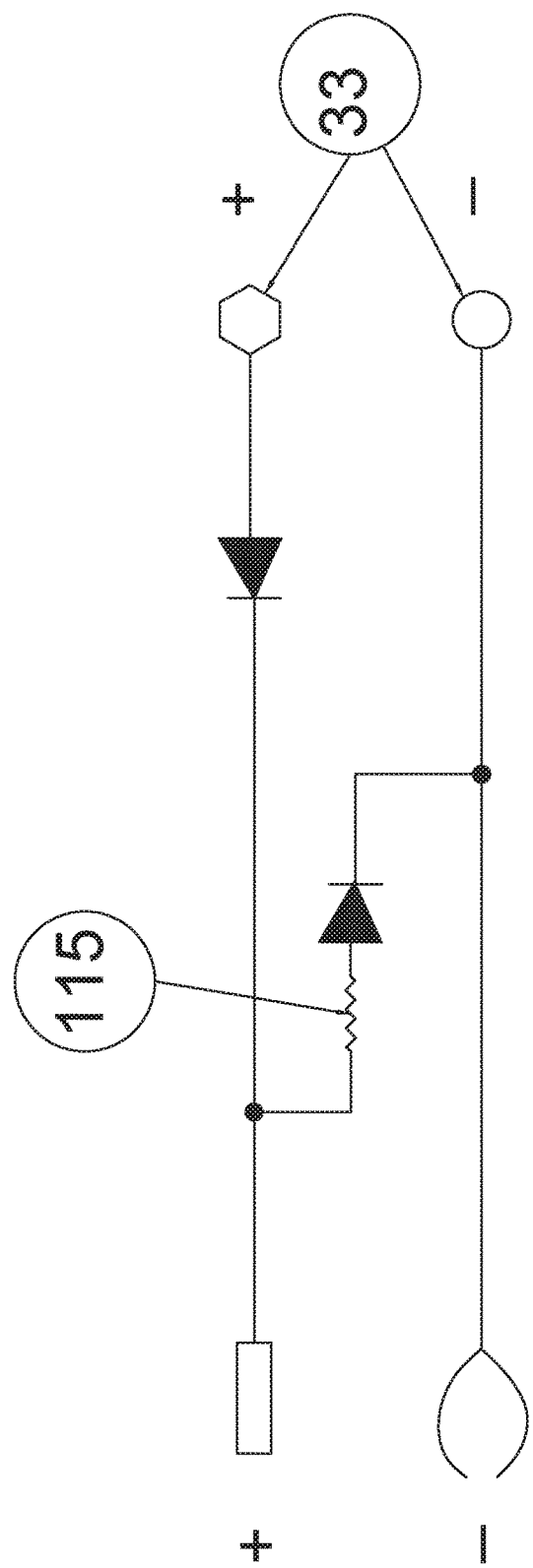
FIG. 10 is a circuit diagram of the adapter.

Now referring to FIGS. 9 and 10, the jumper cables according to the present invention may include an auxiliary power source adapter 30 for energizing the LED and alarm circuits, if necessary. For example, a completely dead battery may not have the minimum capacity, i.e., three volts, to operate the LED circuit thereby increasing the likelihood of an improper connection. The adapter 30 includes a plug 31 of the type typically found on a conventional "cigarette lighter adapter" that is commonly used to power various electronic devices. The plug 31 is configured to mate with the cigarette lighter receptacle in a vehicle passenger compartment. Attached to the plug is a cable 32 with a 9-volt-battery snap-connector 33 at a distal end. When the dead battery is incapable of energizing the LED circuit, a user couples a 9-volt battery with the connector 33 and inserts the plug into the lighter receptacle. The 9-volt battery then back-feeds power to the connected jumper cables to temporarily operate the LED circuitry. An LED 115 on the plug exterior will fail to illuminate whenever a connected 9-volt battery is dead.

Figure 11:
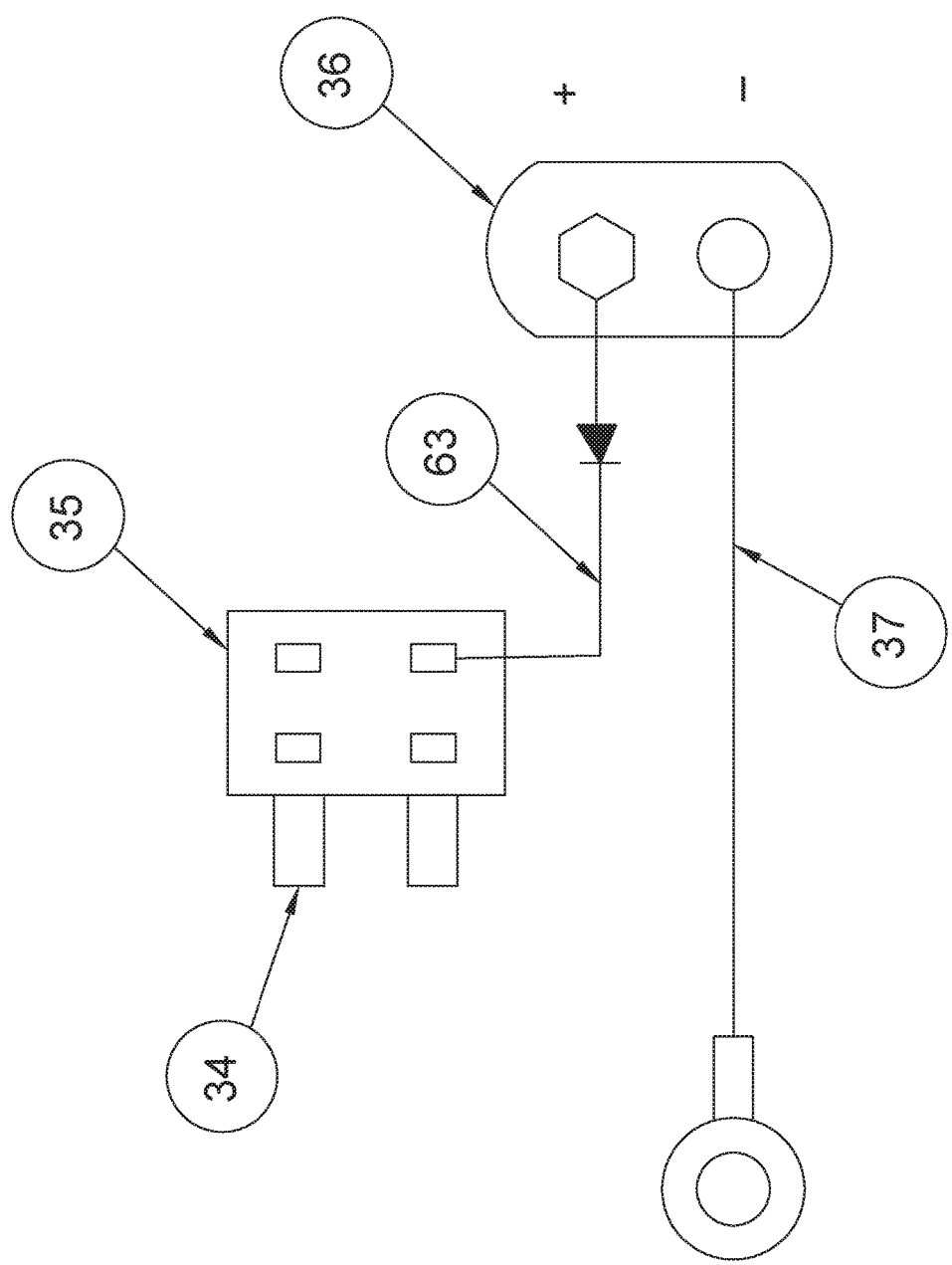
FIG. 11 depicts a second auxiliary power source adapter for coupling with a vehicle fuse box.

Now referring to FIG. 11, the jumper cables may further include a fuse-box adapter 34 including an "add-a-circuit" fuse holder 35 that is plugged directly into a vehicle's fuse box. A 9-volt-battery snap-connector 36 includes a first wire 63 that is connected to the fuse holder 35 and a second wire 37 that is connected to the negative terminal of a vehicle's battery, or the vehicle chassis. Therefore, the 9-volt-battery will back-feed through the vehicle's fuse system if the disabled battery is incapable of powering the LED/alarm circuits. Furthermore, the adapter 34 can be permanently installed on a vehicle to provide backup power for other applications, such as the keyless entry system, which is otherwise inoperable when the vehicle battery is completely exhausted.

To use the jumper cables described above, a user first connects the red clamp 1 and black clamp 2 to the depleted battery terminals and observes the LED 12. If the audible or vibratory alarm activates and the LED 12 illuminates red, the user is notified that the polarity of the connection is reversed. When the clamp connections are interchanged, the alarm 13 should remain dormant and the LED 12 should illuminate green.

Then, the user connects the red clamp 3 and the black clamp 4 to the terminals of a charged battery. If both LEDs are green, and neither alarm is active, then the user may safely rotate the dial to the "ON" position. Before, after and between each step, a user may verify that the two batteries are not interconnected by simply observing the orientation of the handle relative to the cables and the indicia.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. Jumper cables comprising:
    a housing having an upper side, a lower side, a front surface and an interior;
    a first pair of cables extending from the upper side of said housing, one of the first pair of cables having a first clamp at a distal end having a first discrete color for coupling with a positive battery terminal of a depleted battery, a second of said first pair of cables having a second clamp at a distal end having a second discrete color for coupling with a negative terminal of the depleted battery;
    a second pair of cables extending from the lower side of said housing, one of the second pair of cables having a clamp at a distal end having the first discrete color for coupling with a positive battery terminal of a charged battery, a second of said second pair of cables having a clamp at a distal end having the second discrete color for coupling with a negative terminal of the charged battery;
    a first dual-color LED on the upper surface of the housing, proximal the first pair of cables, said first dual-color LED designed to illuminate in either of two discrete colors depending upon current direction;
    a second dual-color LED on the upper surface of said housing, said second dual-color LED positioned adjacent the second pair of cables, said second dual-color LED designed to illuminate in either of two discrete colors depending upon current direction;
    means for illuminating the first dual-color LED in one of said two discrete colors if the first clamp on the first pair of cables is connected to the negative battery terminal and the second clamp on the first pair of cables is connected to the positive terminal;
    means for illuminating the second dual-color LED in one of said two discrete colors if the first clamp on the second pair of cables is connected to the negative battery terminal and the second clamp on the second pair of cables is connected to the positive terminal;
    further comprising an adapter having an auxiliary power source, said adapter configured to connect directly to a vehicle's electrical system having the depleted battery for powering the first dual-color LED in the event the depleted battery is incapable of powering the first dual-color LED.

2. The jumper cables according to claim 1 further comprising a means for suppressing voltage surges from an alternator connected to the charged battery to the depleted battery.

3. The jumper cables according to claim 1 wherein said adapter comprises: a plug configured to mate with a vehicle's cigarette-lighter receptacle and a cable connected to said plug, said cable having a battery connector at a distal end; and
    wherein the auxiliary power source is coupled with said connector.

4. The jumper cables according to claim 1 wherein said adapter comprises: a fuse holder connected to a vehicle's fuse box and a battery connector electrically connected to said fuse holder; and
    wherein the auxiliary power source is coupled with said battery connector.

5. The jumper cables according to claim 1 further comprising a rotary dial on the upper surface of said housing, said rotary dial rotatable between a first position wherein electrical communication between said first pair of cables and said second set of cables is disabled, and a second position wherein electrical communication between said first pair of cables and said second set of cables is established.

6. The jumper cables according to claim 1 further comprising a means for causing a vibration within said housing if the first clamp on the first pair of cables is connected to the negative battery terminal and the second clamp on the first pair of cables is connected to the positive terminal.

7. The jumper cables according to claim 6 further comprising a means for causing a vibration within said housing if the first clamp on the second pair of cables is connected to the negative battery terminal and the second clamp on the second pair of cables is connected to the positive terminal.

8. The jumper cables according to claim 5 wherein said rotary dial includes an elongated, tapered handle with an arrow positioned thereon, said arrow pointing to discrete indicia when said dial is placed in either the first position or the second position.

9. The jumper cables according to claim 8 wherein said elongated handle is perpendicular to the first pair of cables, the second pair of cables, and parallel to the upper side of said housing and the lower side of said housing when said dial is in the first position to provide an additional visual indicator that electrical communication between the first pair of cables and the second pair of cables has been disabled.

* * * * *